(12) United States Patent
Jang et al.

(10) Patent No.: US 6,634,618 B2
(45) Date of Patent: Oct. 21, 2003

(54) WATER SAVING AUTOMATIC VALVE

(76) Inventors: Kil Yong Jang, 2-103, Shindonga apartment, 125-1, Hakik-dong, Nam-gu, 402-040 Inchon (KR); Eung Taek Ju, 2-103, Shindonga apartment, 125-1, Hakik-dong, Nam-gu, 402-040 Inchon (KR)

( * ) Notice: Subject to any disclaimer, the term of this patent is extended or adjusted under 35 U.S.C. 154(b) by 0 days.

(21) Appl. No.: 10/048,299
(22) PCT Filed: May 24, 2001
(86) PCT No.: PCT/KR01/00871
§ 371 (c)(1), (2), (4) Date: Jan. 24, 2002
(87) PCT Pub. No.: WO01/90619
PCT Pub. Date: Nov. 29, 2001

(65) Prior Publication Data
US 2003/0116737 A1 Jun. 26, 2003

(30) Foreign Application Priority Data
May 24, 2000 (KR) .................................. 2000/28059

(51) Int. Cl.[7] .............................................. F16K 21/04
(52) U.S. Cl. .................................................. 251/129.04
(58) Field of Search .................................... 251/129.04

(56) References Cited
U.S. PATENT DOCUMENTS

| | | |
|---|---|---|
| 4,682,628 A | 7/1987 | Hill |
| 4,953,236 A * | 9/1990 | Lee et al. ............... 251/129.04 |
| 4,971,106 A | 11/1990 | Tsutsui et al. |
| 5,062,164 A | 11/1991 | Lee et al. |
| 5,074,520 A | 12/1991 | Lee et al. |
| 5,549,273 A * | 8/1996 | Aharon ................... 251/129.04 |

FOREIGN PATENT DOCUMENTS

| KR | 2000-0000455 | 1/2000 |
|---|---|---|
| KR | 2000-0009541 | 2/2000 |

* cited by examiner

*Primary Examiner*—Paul J. Hirsch
(74) *Attorney, Agent, or Firm*—Abelman, Frayne & Schwab

(57) ABSTRACT

The present invention relates to a water saving automatic valve which can remarkably reduce electricity consumption and can be operated for a long time by a battery. According to the invention, in a water saving automatic valve which is provided at water pipe and supplies or blocks water, there is provided with a water saving automatic valve comprising a housing (4) which is connected to the water pipe, a motor (14) which is provided at the housing (4), a battery (20) which is connected to the motor (14), screw shafts (8, 10) which are connected to the motor (14), a diaphragm (6) which is connected to the screw shafts (8, 10) at the middle of the water line (2) of the housing (4), a sensor (50) which is connected to the battery (20) and has a light emitter (50a) as well as a light receptor (50b), and wherein the sensor (50) is operated in pulse of predetermined period, and wherein the motor (14) is operated according to signal of the sensor (50) and the water line (2) is opened and closed according as the screw shafts (8, 10) are moved back and forth.

1 Claim, 3 Drawing Sheets

WATER SAVING AUTOMATIC VALVE

FIELD OF THE INVENTION

The present invention relates to a water saving automatic valve, and more particularly to a novel water saving automatic valve which can remarkably reduce amount of electricity consumption and can be operated for a long time by a battery.

BACKGROUND OF THE INVENTION

Conventionally, a water saving automatic valve which is provided at a tap or a urinal etc. and can supply or close water automatically comprises a solenoid device opening and closing a water line, and a sensor. Therefore, when a user gets his/her hand near to the tap or the user stands in front of a urinal, the sensor detects this and the solenoid device is operated automatically. Accordingly, after a predetermined amount of water is supplied, the water supply is cut off later. The solenoid device is connected to a diaphragm in the housing of the automatic valve and closes a water line, and the water line can be opened and closed by the diaphragm being moved back and forth by the solenoid device.

By the way, because the automatic valve uses common voltage of 110V or 220V, there is danger of electric shock as well as a problem that it cannot be used in case of power failure. Accordingly, an automatic valve is required which can operate the solenoid device with a battery even in case of power failure. However, because water pressure is constantly put on the water pipe where the automatic valve is provided, the diaphragm must be pressed by a spring in order that it is not removed by this water pressure. Accordingly, in case of pulling the diaphragm and opening the water line, because electricity must be constantly supplied to the solenoid in order to keep in position against elastic power of the spring while the water line is opened, there is a problem that the automatic valve like this cannot be operated for a long time with a battery having limited amount of voltage.

And, in this automatic valve, the sensor may be a photo sensor, and this photo sensor emits light from its light emitter by electric power, and if the emitted light is reflected by a user, the photo sensor receives this light by its light receptor and detects whether there is an object or not. However, because this photo sensor must be supplied with constant electric power in order that its light emitter and light receptor may be operated constantly, as described above, there is a problem that the automatic valve like this cannot be operated for a long time because a battery has limited amount of electric power.

SUMMARY OF THE INVENTION

The invention is intended to resolve the problem described above and so the object of the invention is to provide a water saving automatic valve which can remarkably reduce amount of electricity consumption and can be operated for a long time by a battery.

According to an aspect of the invention, in a water saving automatic valve which is provided at water pipe and supplies water or blocks water, there is provided with a water saving automatic valve comprising a housing 4 which has a water line 2 inside and is connected to the water pipe, a motor 14 which is provided at the housing 4, a battery 20 which is connected to the motor 14 and supplies electric power, a screw shafts 8, 10 which are connected to the motor 14 and reciprocate with rotating, a diaphragm 6 which is connected to the screw shafts 8, 10 at the middle of the water line 2 of the housing 4 and opens or closes the water line 2 according as the screw shafts 8, 10 reciprocate, a sensor 50 which is connected the battery 20 and has a light emitter 50a as well as a light receptor 50b and controls the operation of the motor 14 by detecting approach of a user, and wherein the sensor 50 is operated in a certain pulse section because the light emitter 50a has a pulse generator 51 which is connected to the battery 20 and outputs a pulse and a bias controller 54 which is connected to the pulse generator 51 and transmits bias voltage synchronized with the pulse to the light receptor 50b, and wherein the motor 14 is operated according to signal of the sensor 50 and the water line 2 is opened and closed according as the screw shafts 8, 10 are moved back and forth.

DETAILED DESCRIPTION OF THE INVENTION

The preferred embodiments of the invention will be described in detail below with reference to the accompanying drawings.

Figure 1:
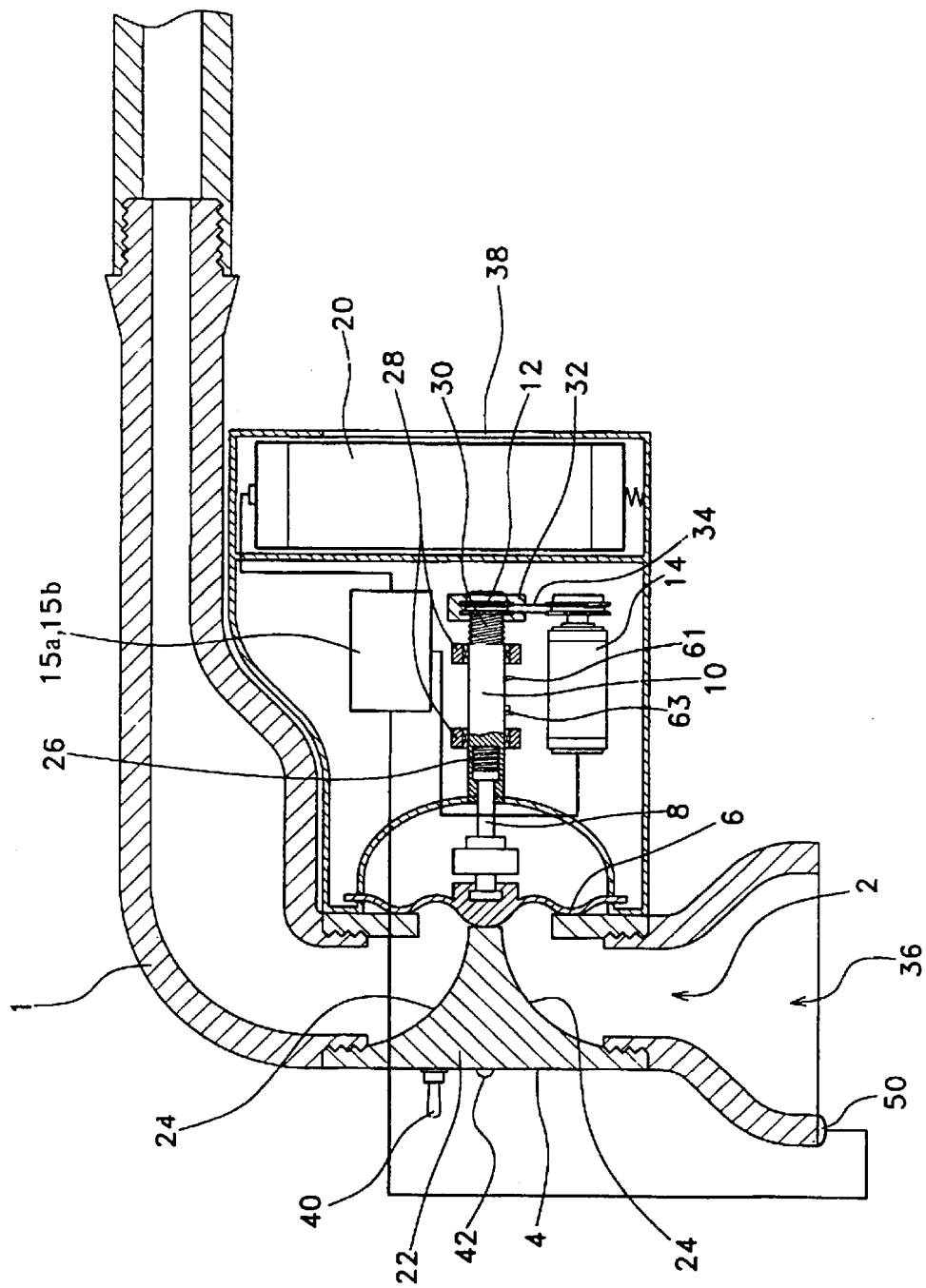
FIG. 1 shows the closed state of a water saving automatic valve according to one embodiment of the invention.
Figure 2:
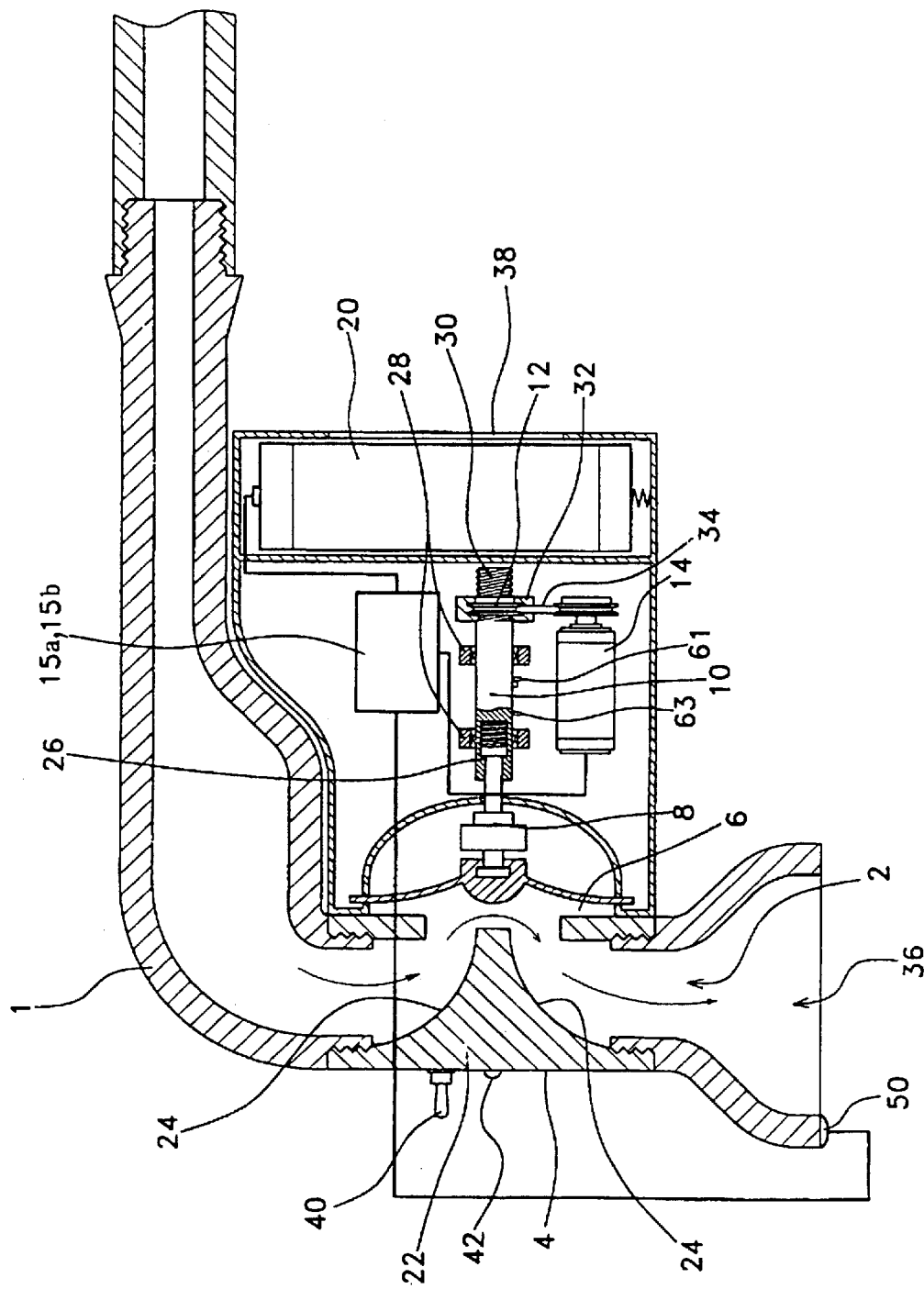
FIG. 2 shows the opened state of a water saving automatic valve of FIG. 1.

FIGS. 1 and 2 show the water saving automatic valve of the invention and more particularly show one embodiment an automatic valve which is provided at a tap 1. As shown in the drawings, the automatic valve comprises a housing 4 which has a water line 2 inside and is connected to water pipe, a motor 14 which is provided at the housing 4 and operated in connection with a battery 20, a screw shafts 8, 10 which are provided at the housing 4 and moved back and forth as well as a wheel 12 which is combined with the screw shafts 8, 10 and rotated by the motor 14, a diaphragm 6 which is provided at the middle of the water line 2 and connected to the end of the screw shafts 8, 10 to open and close the water line 2, and a sensor 50 which is connected to the motor 14.

Figure 3:
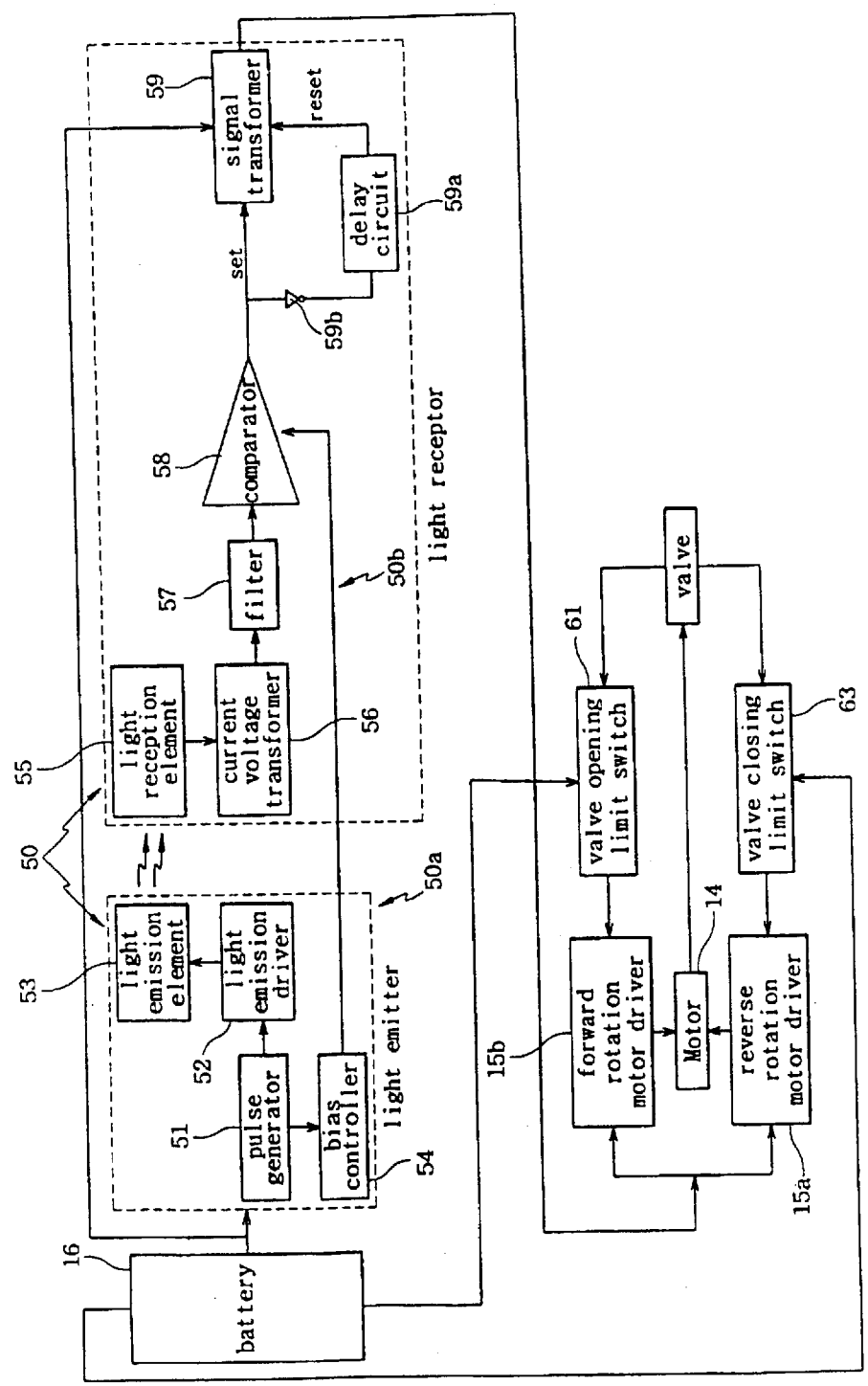
FIG. 3 shows a block diagram of the invention

Further, the sensor 50, as shown in FIG. 3, is a light sensor which has a light emitter 50a as well as a light receptor 50b, and the light emitter 50a has a pulse generator 51 which is connected to the battery 20 to output a pulse and a bias controller 54 which is connected to the pulse generator 51 and transmits bias voltage synchronized with the pulse to the light receptor 50b. And, the light emitter 50a and the light receptor 50b are operated only in a certain pulse section.

The housing 4 is formed with a projection part 22 protruded to the water line 2, and the front side of the diaphragm 6 touches the front end of the projection part 22 and, as a result, the water line 2 is closed. This projection part 22 has curving surface 24 at its front and back surface, and because the water flow through the line 2 is changed in direction and generates whirlpool, and as a result, remnant is not piled up in the water line 2.

The motor 14 is connected to the wheel 2 with a belt 34 and can rotate the wheel 2 in forward and reverse direction. The battery 20 is provided in a battery case 38 at the one side of the housing 4 and can be exchanged with ease. Here, the wheel 12 can be connected to the motor with a gear instead of the belt 34.

The screw shafts 8, 10 include the first shaft 8 and the second shaft 10, and a spring 26 is engaged between the shafts 8, 10. As a result, the shafts 8, 10 can be expanded and contracted. The second shaft 10 is provided at a sliding guide 28 of the hosing 4 and moves to and fro, and the first shaft 8 is provided on the same coaxial line of the front end of the second shaft 10, and the diaphragm 6 is connected to the front end of the second shaft 10 in one body. Further, a screw part 30 is formed on circumference surface of the first shaft 8, and the wheel 12 is combined with the first shaft 8 by the screw part 30. The wheel 12 is rotationally provided at the bracket 32 in the housing 4, and, if the wheel 12 is rotated, the screw shafts 8, 10 are moved back and forth.

The sensor 50 is a photo sensor provided at a light emitter 50a and a light receptor 50b, and the light emitter 50a has a pulse generator 51 which receives electric power from a battery 20 and outputs pulse, a light emission driver 52 which is connected to the pulse generator 51 and makes the light emission element 53 driven only in pulse of high level, a light emission element 53 which emits light of wave by the light emission driver 52, and a bias controller 54 which is connected to the pulse generator 51 and outputs a bias voltage synchronized with pulse of the pulse generator 51. And, the light receptor 50b includes a light reception element 55 which receives the light reflected by a user and transforms the light into the corresponding current, a current-voltage transformer 56 which, transforms the current outputted from the light reception element 55 into the corresponding voltage and amplifies it, a filter 57 which filters a natural light signal among the signals outputted from the current-voltage transformer 56, and a comparator 58 which compares the voltage generated from the current-voltage transformer 56 with the reference voltage and detects whether there is an object or not.

Here, the pulse generator 51 receives a direct electric power from the electric power supplier 20 and outputs the pulse whose duty ratio is low. And, the duty ration is preferably 1/50000. The light emission driver 52 is operated in order to emit light only in pulse of high level outputted from the pulse generator 51. The bias controller 54 generates a bias voltage synchronized with pulse signal of the pulse generator 51 and transmits the bias voltage to the comparator 58. The compartor 58 compares the output voltage of the filter 57 with predetermined voltage and generates object detection signal. Numeral 59b is an invertor, and this inverts the voltage outputted from the comparator 58. Numeral 359a is a delay circuit, and this removes the signal of the invertor 59b generated owing to the time delay of the light reception element 55. Numeral 59 is a signal transformer, and this receives the signals outputted from the comparator 58 as well as the delay circuit 59a, and outputs a continuous signal according as whether there is an object or not and so on.

And, a couple of limit switches 61, 63 operated according as the first screw shaft 8 and the second screw shaft 10 reciprocate are provided in the housing 4. These limit switches 61, 63 are connected to the motor drivers 15a, 15b and control the operation of the motor 14 by detecting whether the valve is opened or closed completely. Therefore, the motor 14 is controlled not to be operated further when the valve is opened or closed completely.

Accordingly, if a user gets his hand near to the exhaust port 36 of the housing 4, the sensor 50 detects this and the motor drivers 15a, 15b rotate the motor 14 according to the signal of the sensor 50 and remove the screw shafts 8, 10, and accordingly, the diaphragm 6 is separated from the guidance portion 22 and opens the waterway 2, and, as a result, the water can be exhausted.

Further, if the user keeps the hand away from the exhaust port 36 of the housing 4, the motor drivers 15a, 15b rotate the motor 14 according to the signal of the sensor 50 and pushes the screw shafts 8, 10, and because the diaphragm 6 is tightly contacted to the top of the projection part 22 and closes the water line 2, the water can be blocked. Here, when the screw shafts 8, 10 move forwardly and the diaphragm 6 is contacted to the end of the projection part 22, because the spring 26 between the first screw shaft 8 and the second screw shaft 10 cam absorb shock, it can be prevented that the diaphragm 6 is overly pressed to the projection part 22 and is damaged. And, because the screw shafts 8, 10 may be self locked with the wheel 12 and the screw shafts 8, 10 don't reciprocate if the wheel 12 is not rotated, it can be prevented that the diaphragm 6 is pushed away.

Numeral 40 shows a manual switch which a user can supply and block water manually, and numeral 42 shows an alarm lamp notifying that the battery 20 has been discharged.

Although the screw shafts 8, 10 are provided at the sliding guide 28 and moved back and forth in accordance with rotation of the wheel 12, according to the embodiment of the invention, the screw shafts 8, 10 may be combined in the housing 4 and the motor 14 may be connected to the screw shafts 8, 10, and this screw shafts 8, 10 may be rotated and moved back and forth in accordance with driving of the motor 14.

As described above, the water saving automatic valve of the invention has the advantage that there is no danger of electric shock and can be used even in case of power failure because it can open and close the waterway 2 by a battery 20. And, the invention has the advantage that, when the water line 2 is completely opened or closed, as the limit switches 61, 63 detect this and keep the water line 2 opened and closed by stopping the motor 14, the electric power is consumed only when the screw shafts 8, 10 are moved back and forth. Further, the water saving automatic valve of the invention has the advantage that the consumption of the electric power can be reduced because the sensor 50 is operated only in the high level period of pulse and detects approach of a user. Therefore, the water saving automatic valve has the advantage that it can be operated by a small battery 20 for a long, time because little of electric power is consumed.

The embodiment of the invention illustrates an automatic valve provided at a tap, but this automatic valve, like the automatic valve provided at the urinal, can be applied to all kinds of valves which supplies or blocks water automatically by a sensor 50.

It is to be understood that, while the invention was described with respect to respective preferable specific embodiments, the invention is not restricted to those embodiments and a variety of modifications and alterations would be possible to a man skilled in the art by referring to the description or drawings presented here and within the spirit of the invention and thus those modifications or alterations are to fall within the scope of the invention, which scope should be limited only by the attached claims.

What is claimed is:

1. An energy-saving electrically-powered automatic fluid control valve assembly for supplying and blocking a flow of fluid in response to the proximity of an object, the valve assembly comprising:

a) a valve body having a valve seat;
   b) a diaphragm that is moveable between a first closed position in contact with the valve seat to prevent the passage of a fluid through the valve and a second open position to permit the passage of fluid through the valve;

c) an actuator shaft that operatively engages the diaphragm to move the diaphragm between the first and second positions;

d) a drive motor that is operatively connected to the actuator shaft to cause said actuator shaft to move between the first and second positions when said drive motor is activated;

e) a battery connected to said drive motor;

f) a control circuit connected to said battery and motor, said control circuit components comprising:

i. an emitting means connected to said battery comprising:

a pulse generator for generating a pulsed signal; and a bias controller connected to said pulse generator for transmitting a bias signal synchronous with said pulsed signal; and ii. receiving means for receiving the emitted pulsed signal and activating said drive motor in response to said pulsed signal, said receiving means comprising:

a receiver for receiving the emitted pulsed signal; and a comparator for comparing the received pulsed signal with said bias signal and determining whether an object is detected and outputing a driving signal in response to a detected object, whereby said drive motor is driven in response to the driving signal from said comparator, and wherein all of the control circuit components except said pulse generator are operated only during a high state portion of said pulsed signal.

* * * * *